United States Patent

[11] 3,634,113

[72] Inventor Larry L. Fehrenbacher
1613 Greenoak Court, Fairborn, Ohio 45324
[21] Appl. No. 772,000
[22] Filed Oct. 30, 1968
[45] Patented Jan. 11, 1972

[54] STABILIZED ZIRCONIUM DIOXIDE AND HAFNIUM DIOXIDE COMPOSITIONS
8 Claims, No Drawings

[52] U.S. Cl............................................. 106/55,
106/57, 136/86 D, 136/153
[51] Int. Cl......................................................C04b 35/48,
C04b 35/50
[50] Field of Search............................................. 106/57, 55;
136/86 D, 86 F, 153

[56] References Cited
UNITED STATES PATENTS

| | | | |
|---|---|---|---|
| 3,402,078 | 9/1968 | Spacil............................ | 136/86 F |
| 3,404,039 | 10/1968 | Mitoff............................ | 136/86 F |
| 3,404,040 | 10/1968 | Mitoff et al..................... | 136/86 F |
| 3,259,585 | 7/1966 | Fitch et al...................... | 106/57 |
| 3,268,349 | 8/1966 | Brixner.......................... | 106/57 |
| 3,432,314 | 3/1969 | Mazdiyasni et al.............. | 106/57 |

*Primary Examiner*—James E. Poer
*Attorneys*—Harry A. Herbert, Jr. and Alvin B. Peterson

ABSTRACT: A type C mixed rare earth oxide solid solution is used to eliminate the monoclinic phase of zirconium dioxide and thus produce a stable refractory. The type C solid solution consists primarily of oxides of dysprosium, erbium, ytterbium, and holmium with small amounts of thulium, terbium, and lutetium. This solid solution is applicable to hafnium dioxide and to mixtures of hafnium dioxide with zirconium dioxide as well.

STABILIZED ZIRCONIUM DIOXIDE AND HAFNIUM DIOXIDE COMPOSITIONS

BACKGROUND OF THE INVENTION

1. Field of the Invention

This invention is in the field of stabilization of refractories, said refractories utilizing zirconium dioxide, hafnium dioxide or mixtures thereof as the refractory material.

2. Description of the Prior Art

The use of pure zirconium dioxide as a refractory material is precluded by a destructive volume change associated with a monoclinictetragonal phase transformation in the region of 1,850°–2,200° F. Pure hafnium dioxide undergoes the same phase transition between 2,800° F. and 3,00° F. Mixtures of pure zirconia and pure hafnia also undergo the transition with the phase transition temperature increasing linearly from about 2,000° F. for pure $ZrO_2$ to 3,000° F. for pure $HfO_2$. Consequently, numerous studies have been directed towards the elimination of this deleterious structure change.

Commercial use of zirconia as a refractory resulted from the development of cubic stabilized $ZrO_2$ with additives such as CaO, MgO, and $Y_2O_3$. These stabilizing agents have been found to be most effective when added in amounts which left up to 15 percent of the zirconia in the monoclinic form. That is, the zirconia refractories were considered to have their most desirable properties when only approximately 85 percent stabilized. A recent study found that material stability was strongly influenced by the amount of retained monoclinic phase. Partially stabilized refractories were found to break up after several heatings and coolings because the stresses arising from the transformation of the small amount of monoclinic phase were sufficient to force a stabilizer such as CaO out of solid solution and thus produce additional monoclinic zirconia.

Completely stabilized zirconia has been found to have too high a coefficient of expansion to be highly resistant to thermal shock. Thus the search has gone on to determine a best stabilizing agent and how much monoclinic form should be left in the final product. Zirconia has been doped with practically every element in the Periodic Table, either as a metal or an oxide. The prior art methods have been complex and expensive.

SUMMARY OF THE INVENTION

This invention discloses a novel stabilizing material which may be used to stabilize zirconia, hafnia or mixtures of the two, is inexpensive, and may be used in a multitude of ways. The monoclinic phase is completely eliminated from the refractories produced by this invention and only cubic or cubic and a small amount of tetragonal are left.

The first step of stabilization consists of mixing appropriate amounts of type C mixed rare earth oxide solid solution with zirconia, hafnia or mixtures thereof. The mixture may then be formed into any desired shaped by a variety of methods and heated to produce the final refractory.

The type C mixed rare earth oxide solid solution comprises primarily oxides of dysprosium, erbium, ytterbium, and holmium with small amounts of oxides of thulium, lutetium, and terbium. Type C rare earth oxides are those which exist in cubic form at room temperature. A typical solid solution used was found to have 15.2 percent $Yb_2O_3$, 45.0 percent $Dy_2O_3$, 28.0 percent $Er_2O_3$, 9.2 percent $Ho_2O_3$, 1.3 percent $Tb_2O_3$, 1.0 percent $Tm_2O_3$, and 0.3 percent $Lu_2O_3$. The relative concentrations were determined by X-ray fluorescence and emission spectrographic analysis. X-ray diffraction and infrared absorption analysis revealed that the material was a single phase, body centered cubic mixture.

Type C mixed rare earth material in the form of salts such as chlorides or oxalates may be used in lieu of the oxides.

The final refractories produced by this invention may be in either an entirely cubic form or in a mixed tetragonal-cubic form depending on the relative amount of stabilizing material used. They are dense, nonporous and do not split, crumble, or flake upon repeated heating and cooling. They are hard and have excellent thermal shock resistance.

DESCRIPTION OF THE PREFERRED EMBODIMENTS

PREPARATION OF RARE EARTH OXIDE MIXTURE

Suitable rare earth oxide mixtures are obtained from an ion exchange process using diethylene-triamminepentaacetic acid (DTPA) as the ion exchange resin. The ion exchange columns are fed with a lanthanide mixture, which includes all the rare earths plus $Y_2O_3$, from which constituents such as thoria, ceria, and zirconia have previously been removed by solution extraction. The length and size of the ion exchange bed determine the time at which the mixture is ready for separation. Since the rate of ion exchange for the rare earth series increases with increasing atomic weight, the heavier rare earths are removed first. By sampling the column during the process the rare earth mixtures may be removed at the proper time. The concentrations of the various type C constituents will vary somewhat with different ores. A typical example of relative concentrations is given above. However, changes in relative concentrations of the type C components do not adversely affect the performance of the mixed rare earth material as a stabilizing agent.

The chelated, mixed rare earths, which have been removed from the ion exchange column, may be reacted with either oxalic or hydrochloric acid to yield oxalate or chloride precipitates. On calcining at 800°–1,000° C., the oxalate is converted to a mixed rare earth oxide.

STABILIZATION OF ZIRCONIA

Some specific examples of stabilization methods follow:

EXAMPLE I

A 99.9 percent pure $ZrO_2$ powder was mechanically mixed in a dry ball mill with a type C mixed rare earth oxide powder to yield a composition of 6 mole percent mixed rare earth oxides and 94 mole percent zirconia. The mixed rare earth oxide powder was a solid solution containing oxides of dysprosium, erbium, ytterbium, holmium, thulium, and terbium in approximately the relative amounts disclosed above. The intimate mixture of powders was dry pressed into cylindrical wafers at 10,000 p.s.i. and sintered in vacuum at 1,800° C. for 4 hours. The oxygen reduced wafers were then reoxidized in air at 800° C. and, after reoxidation, exhibited fired densities of 90 percent theoretical or greater and were completely cubic in crystal structure.

EXAMPLE II

Mixed type C rare earth oxide solid solution containing the oxides and approximately the relative amounts disclosed above was dissolved in hot hydrochloric acid and enough was added to a zirconium oxychloride ($ZrOCL_2·8H_2$) solution to yield a 10 percent mixed rare earth oxide—90 percent zirconia mixture. This liquid mixture was titrated into a solution of concentrated $NH_4OH$ with constant magnetic stirring until a fine coprecipitate powder of mixed rare earth—zirconium hydroxide was formed. After complete precipitation, the powder was washed several times with acetone and then completely dried in an oven at 200° F. After drying, the powder was calcined in air at 800° C. to yield a reactive, intimate mixture of the oxides. This calcined powder was pressed into wafers at 10,000 p.s.i. and the wafers sintered in air at 1,500° C. for 12 hours. Fully cubic specimens with densities 90 percent or greater of theoretical resulted.

The foregoing specific examples show only two of the ways in which refractories may be prepared utilizing the stabilizing material of this invention. Any of the following techniques can be used:

1. Appropriate amounts of $ZrO_2$ and type C mix powders may be physically mixed, wet or dry, with or without ball milling, and compacted and reacted by techniques such as cold pressing, sintering, and hot pressing using a variety of heat schedules and temperatures depending on the final strength and density desired. In addition, slip casting and subsequent firing of shapes may be accomplished by an addition of a small amount of acid such as HCl to a wet slurry.

2. Proper amounts of chloride and/or oxalate salts of zirconium—type C material may be coprecipitated from solution, calcined, compacted and fabricated into cubic refractory bodies.

3. Cubic products of this 8 percent–92 percent zirconia composition may be fabricated by a reactive hot pressing technique. That is, the decomposition of dry salt mixtures may be utilized to effect densification through the proper application of temperature and pressure after decomposition.

Due to the wide range of processing and forming techniques available, temperatures involved in the chemical reaction and consolidation process may range from 2,000° C. for physically mixed, cold pressed, sintered material to 1,200°–1,600° C. for coprecipitated (chemically mixed) and hot pressed bodies. Reactive hot pressing involves temperatures of from 700° C. to 1,200° C.

Mixtures of zirconia and type C mixed rare earth oxides stabilizing material containing 4 mole percent to 20 mole percent of the stabilizing material may be utilized. Mixtures containing 6 mole percent to 20 mole percent of the stabilizing material yield completely cubic refractories. Mixtures containing 4 mole percent to 6 mole percent of the stabilizing material yield bodies which contain small amounts of the tetragonal phase but are still primarily cubic and have no monoclinic phase.

All the above discussion and examples apply equally to hafnium dioxide and hafnia-zirconia mixtures. Thus, the mixed rare earth oxide additive will stabilize a cubic form of $HfO_2$ and $HfO_2$–$ZrO_2$ mixtures in the same manner as it does for $ZrO_2$. This additive will permit the use of improved, stabilized hafnia refractories in refractory applications up to 2,500° C. or higher.

I claim:

1. A stabilized cubic metal oxide consisting essentially of a metal oxide selected from the group consisting essentially of a metal oxide selected from the group consisting of $ZrO_2$, $HfO_2$, and mixtures thereof stabilized with a type C mixed rare earth oxide solid solution containing $Yb_2O_3$, $Er_2O_3$, $Dy_2O_3$, $Ho_2O_3$, $Tb_2O_3$, $Tm_2O_3$ and $Lu_2O_3$ wherein 80 to 94 mole percent of said stabilized cubic metal oxide is said metal oxide and wherein 20 to 6 mole percent of said stabilized cubic metal oxide is said type C mixed rare earth solid solution.

2. A stabilized cubic metal oxide according to claim 1 wherein said type C mixed rare earth oxide contains about 15.2 percent $Yb_2O_3$, 45.0 percent $Dy_2O_3$, 28.0 percent $Er_2O_3$, 9.2 percent $Ho_2O_3$, 1.3 percent $Tb_2O_3$, 1 percent $Tm_2O_3$, and 0.3 percent $Lu_2O_3$.

3. A stabilized cubic metal oxide according to claim 1 wherein said metal oxide is $ZrO_2$.

4. A stabilized cubic metal oxide according to claim 1 wherein said metal oxide is $HfO_2$.

5. A stabilized cubic metal oxide according to claim 1 wherein said metal oxide is a mixture of $ZrO_2$ and $HfO_2$.

6. A stabilized cubic metal oxide according to claim 2 wherein said metal oxide is $ZrO_2$.

7. A stabilized cubic metal oxide according to claim 2 wherein said metal oxide is $HfO_2$.

8. A stabilized cubic metal oxide according to claim 2 wherein said metal oxide is a mixture of $ZrO_2$ and $HfO_2$.

* * * * *